UNITED STATES PATENT OFFICE.

EDWARD P. HUDSON, OF WASHINGTON, DISTRICT OF COLUMBIA.

IMPROVEMENT IN THE MANUFACTURE OF STEEL.

Specification forming part of Letters Patent No. 45,828, dated January 10, 1865.

*To all whom it may concern:*

Be it known that I, EDWARD P. HUDSON, of Washington, in the county of Washington and District of Columbia, have invented a new or Improved Method or Process of Manufacturing Cast-Steel; and I do hereby declare that the following is a full and exact description thereof.

My method or process of manufacturing cast-steel consists in decarbonizing pig-iron or other carbonized iron and reducing it to a finely-divided state, substantially as hereinafter specified, and in combining by melting the said decarbonized iron with pig-iron or other carbonized iron in the proportions to produce the different grades of cast-steel desired. By this process of mixing an iron wholly deprived of carbon, as described herein, with a carbonized iron having a determinate per cent. of carbon above that contained in cast-steel, I obtain by simple proportion the desired grade of cast-steel with great certainty.

The iron to be decarbonized may be pig-iron direct from the blast-furnace, or any other suitable carbonized iron, refined, if desired, by any of the known means, such as casting into water or into plates.

The decarbonized iron might be produced directly from the ore, the whole process of smelting and decarbonizing being completed at once in a furnace suitable for the purpose, without cooling and remelting; but the method which I employ is to decarbonize suitable pig-iron in a common puddling-furnace, substantially as follows: The iron, placed in the puddling-furnace, is treated until the boil is completed as though it were being worked to wrought-iron. When the metal subsides in the furnace, instead of continuing the heat and working the mass into balls, it is permitted to remain in a separated, fine, granular form, of small particles or lumps, which it naturally assumes. Every part of the mass in turn is exposed to the flame so regulated as not to oxidize the metal. When the decarbonization has been thus uniformly accomplished the whole mass is removed from the furnace by any suitable means, and, when cold, consists of the iron in its finely-divided state, and of cinder intimately mixed with and more or less coating the particles of metal. This is placed under stamps or pounded in any convenient manner in order to separate the cinder from the metal. The cinder is thereby crushed into dust, which is separated from the iron by screening through a fine sieve; or, better, the metal may be separated from the cinder by means of the magnetic separator, thereby saving all the particles of iron thoroughly freed from the cinder. This metal is nearly pure iron, being wholly or almost entirely decarbonized. The prepared decarbonized iron is then to be melted with pig-iron, or iron containing a higher per cent. of carbon than cast-steel, in such proportions as to produce the grade of cast-steel desired.

The proportions of the carbonized and decarbonized irons will necessarily vary with the grade of the pig or carbonized iron—that is, with the quantity of carbon which it contains; but, using a medium grade of the carbonized iron, steel possessing great hardness or good body may be produced by taking equal weights, or thereabout, of the prepared decarbonized iron and of the pig or carbonized iron. For steel of medium grade possessing more "nature," the proportions are from about one part of the pig or carbonized iron and two parts of the prepared decarbonized iron to two of the carbonized iron and three of the decarbonized iron, according to the variation in grade of the carbonized iron employed. A good low grade of steel requires about three parts of the decarbonized iron to one part of the carbonized iron. The two materials are placed in the crucible and reduced to a perfectly fluid state in a melting-furnace. If used in large pieces, the pig or carbonized iron is generally placed at the top in the crucible, in order that when melted it may flow into and distribute itself suantly through the decarbonized iron, and thereby produce a uniform grade of steel. The metal is then cast into molds in the usual manner of making cast-steel, the cinder present being removed at the time of pouring. The ingots of steel are then heated, hammered, and rolled in the usual way.

What I claim as my invention, and desire to secure by Letters Patent, is—

The manufacture of cast-steel by combining decarbonized iron, prepared substantially as herein described, with pig or other carbonized iron, as herein specified.

The above specification of my improved process for making cast-steel signed by me this 19th day of November, 1864.

EDWARD P. HUDSON.

Witnesses:
JNO. S. MOODEY,
LEVI F. BURNETT.